United States Patent
Patel et al.

(10) Patent No.: US 11,136,472 B2
(45) Date of Patent: Oct. 5, 2021

(54) MULTILAYER DECORATIVE COATING COMPOSITION WITH LOW DISCOLOURATION

(71) Applicant: SIKA TECHNOLOGY AG, Baar (CH)

(72) Inventors: Arpan Patel, Edgware (GB); Stephen Glover, Shorley (GB); Mark Gatrell, Chipping Preston (GB); Michael Byrne, Lytham (GB); Daniel Brearley, Salford (GB); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 56 days.

(21) Appl. No.: 16/480,288

(22) PCT Filed: Jan. 26, 2018

(86) PCT No.: PCT/EP2018/051945
§ 371 (c)(1),
(2) Date: Jul. 23, 2019

(87) PCT Pub. No.: WO2018/138253
PCT Pub. Date: Aug. 2, 2018

(65) Prior Publication Data
US 2020/0040218 A1 Feb. 6, 2020

(30) Foreign Application Priority Data

Jan. 26, 2017 (EP) ..................................... 17153405

(51) Int. Cl.
*C09D 175/04* (2006.01)
*C08G 18/08* (2006.01)
*C08G 18/44* (2006.01)
*C08K 3/22* (2006.01)

(52) U.S. Cl.
CPC ....... *C09D 175/04* (2013.01); *C08G 18/0819* (2013.01); *C08G 18/44* (2013.01); *C08K 2003/2241* (2013.01); *C08K 2201/005* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 5,126,421 A | 6/1992 | Majewski et al. | |
| 5,189,176 A | 2/1993 | Blum et al. | |
| 5,747,627 A | 5/1998 | Kimura et al. | |
| 2011/0105645 A1 | 5/2011 | Nagel et al. | |
| 2017/0029661 A1* | 2/2017 | Allen | F16D 25/0638 |

FOREIGN PATENT DOCUMENTS

| | | |
|---|---|---|
| CN | 101481572 A | 7/2009 |
| CN | 101864242 A | 10/2010 |
| EP | 0 499 188 A1 | 8/1992 |
| EP | 2 327 733 A1 | 6/2011 |
| EP | 2 966 103 A1 | 1/2016 |
| GB | 1 292 455 A | 10/1972 |
| GB | 1 463 944 A | 2/1977 |
| WO | 96/08308 A1 | 3/1996 |
| WO | 99/07762 A1 | 2/1999 |
| WO | 2014/059597 A1 | 4/2014 |
| WO | 2014/097309 A1 | 6/2014 |

OTHER PUBLICATIONS

Apr. 23, 2018 International Search Report issued in International Patent Application No. PCT/EP2018/051945.
Apr. 23, 2018 Written Opinion of the International Searching Authority issued in International Patent Application No. PCT/EP2018/051945.

* cited by examiner

*Primary Examiner* — Jeffrey D Washville
(74) *Attorney, Agent, or Firm* — Oliff PLC

(57) ABSTRACT

A coating composition including at least one water-based anionic polyurethane dispersion and 0.1 to 4 weight-% of nanoparticulate $TiO_2$ having an average particle size of not more than 100 nm, based on the solids content of the coating composition. The cured coating composition is suitable as a top coat in a decorative multilayer coating system including at least one polyurethane base coat. The multilayer coating system exhibits improved non-yellowing property and cleanability. The liquid multilayer coating system is particularly suitable for balcony applications.

14 Claims, No Drawings

MULTILAYER DECORATIVE COATING COMPOSITION WITH LOW DISCOLOURATION

FIELD OF THE INVENTION

The invention relates to a coating composition based on an aqueous anionic polyurethane dispersion, and multilayer coating systems in which said coating composition constitutes the top coat, in particular for balcony applications.

BACKGROUND OF THE INVENTION

Balconies are highly exposed to weathering and mechanical wear. The load-bearing concrete substrate of balconies therefore requires protection, e.g. against penetration of moisture. The application of liquid-applied multilayer coating systems based on polyurethanes on such balcony substrates is known. These multilayer coating systems can provide the necessary protection and fulfill a decorative function at the same time.

Generally, state-of-the-art liquid-applied coating compositions are often reactive polyurethane compositions, formulated as one-part or as two-part systems, also called single-component or two-component systems, respectively. Two-part systems are more complex to apply, requiring special mixing equipment and proper metering of the two components. One-part systems are easy to apply, but prone to curing defects. State-of-the-art one-part systems often comprise blocked amine hardeners, in particular oxazolidines or aldimines, to prevent excessive gassing from carbon dioxide formation on curing. They generally contain considerable amounts of organic solvents to guarantee low viscosity and sufficient shelf life.

The use of aliphatic polyurethanes in the production of a transparent top coat in such multilayer decorative systems is also known.

For instance, a balcony waterproofing system offered by Sika AG, Switzerland, is based on the following components:

Sikafloor®-405 for base coating which is a one-part highly elastic, low solvent containing UV resistant pigmented moisture curing polyurethane resin coating.

Sikafloor-416 which is one-part PUR elastic matt seal coat including translucent aliphatic polyurethane resin that is moisture cured and UV resistant.

Another balcony waterproofing system offered by Sika AG is based on the following components:

Sikafloor®-400N for base coating which is a one-part highly elastic, low solvent containing UV resistant coloured moisture curing polyurethane resin coating which is suitable for airless spray and roller application.

Sikafloor®-410 which is a one-part elastic, solvent containing, UV resistant and moisture curing polyurethane resin based matt sealer coat.

There is also a wide range of competitor products currently available on the market.

A problem which occurs in balcony waterproofing systems with conventional top coats is discolouration or yellowing which is thought to be the result of leeching of organic compounds from the base coat into the top coat and indeed the discolouration of volatile organic compounds which may be leaving groups of the underlying basecoat, for instance organic solvents, propylene carbonates or aldehydes trapped between base and top coat on exposure to UV radiation. This discolouration problem is particularly pronounced if organic hardeners are used in the balcony waterproofing system, for instance due to aldehyde leaving groups of blocked amine hardeners.

There is also a need to provide systems with more easy cleanable surfaces.

SUMMARY OF THE INVENTION

The task of this invention is to provide a top coat, in particular a transparent top coat, with enhanced surface properties that can improve cleanability and prevent discolouration or yellowing caused by underlying pigmented decorative coating systems, in particular for balcony applications.

Surprisingly it was found that a coating composition comprising at least one water-based anionic polyurethane dispersion and 0.1 to 4 weight-% of nanoparticulate $TiO_2$ having an average particle size of not more than 100 nm, based on the solids content of the coating composition, whereby the average particle size of nanoparticulate $TiO_2$ is determined as the number-average primary particle diameter as measured by transmission electron microscopy (TEM) according to ISO/TS 11937:2012, fulfills this task and has additional benefits. In particular, it has been found that the presence of nanoparticulate $TiO_2$ in certain amounts in the formulation of an anionic water-based PUD used as a top coat reduce UV transmission and surprisingly prevents discolouration in the underlying aliphatic coating system. This has also shown to have such effect on aromatic PU coatings though to a lesser extent.

The primary advantage of the invention is the reduction of discolouration or yellowing in a multilayer decorative system after UV weathering and a surprising notable improvement in the ease of cleaning of the surface of the system with nanoparticulate titanium dioxide incorporated into it.

Other aspects of the invention are revealed in other independent claims. Preferred aspects of the invention are revealed in the dependent claims.

DETAILED DESCRIPTION OF THE INVENTION

The subject of the present invention is a coating composition comprising at least one water-based anionic polyurethane dispersion and 0.1 to 4 weight-% of nanoparticulate $TiO_2$ having an average particle size of not more than 100 nm, based on the solids content of the coating composition.

In this document, the term "one-part moisture-curing" refers to a liquid-applied coating composition, which is contained in a single moisture-tight container, has a certain shelf life stability and cures when exposed to moisture. In this document, the term "polyurethane polymer" includes all polymers prepared by the so-called diisocyanate polyaddition process. It includes isocya-nate-functional polyurethane polymers obtained by reacting polyisocyanates and polyols, which may also be called prepolymers and are polyisocyanates themselves. PU is an abbreviation for polyurethane polymer and PUD is an abbreviation for a dispersion of polyurethane polymer.

In this document the term "chain extender" refers to a difunctional compound carrying two functional groups which are reactive with isocyanate groups, transforming them to linking groups, in particular urea or urethane groups. In this document, substance names starting with "poly", such as polyol, polyisocyanate or polyamine, refer to substances carrying two or more of the respective functional groups (e.g. OH groups in the case of polyol) per molecule.

In this document an amine or an isocyanate is called "aliphatic" when its amino group or its isocyanate group, respectively, is directly bound to an aliphatic, cycloaliphatic or arylaliphatic moiety. The corresponding functional group is therefore called an aliphatic amino or an aliphatic isocyanate group, respectively.

In this document an amine or an isocyanate is called "aromatic" when its amino group or its isocyanate group, respectively, is directly bound to an aromatic moiety. The corresponding functional group is therefore called an aromatic amino or an aromatic isocyanate group, respectively.

In this document, the term "primary amino group" refers to an $NH_2$-group bound to an organic moiety, and the term "secondary amino group" refers to a NH-group bound to two organic moieties which together may be part of a ring.

In this document the acronym "VOC" stands for "volatile organic compounds", which are organic substances having a vapour pressure of at least 0.01 kPa at a temperature of 293.14 K.

In this document, the term "solvent" refers to a liquid which is usually a VOC and not chemically reactive in compositions or reactions in which it is contained.

In this document, "room temperature" refers to a temperature of 23° C. In this document the term "molecular weight" refers to the molar mass (given in grams per mole) of a molecule or a part of a molecule, also referred to as "moiety". The term "average molecular weight" refers to the number-average molecular weight ($M_n$) of an oligomeric or polymeric mixture of molecules or moieties.

A dispersion contains solid particles in a liquid medium. An aqueous dispersion comprises water and optionally at least one organic solvent as liquid medium.

In this document, the average particle size of nanoparticulate $TiO_2$ refers to the number-average primary particle diameter as measured by transmission electron microscopy (TEM) according to ISO/TS 11937:2012.

The coating composition of this invention comprises at least one water-based anionic polyurethane dispersion. The water-based anionic polyurethane dispersion is an aqueous dispersion of a polyurethane polymer having anionic groups, which is typically contained in form of particles.

The polyurethane polymer having anionic groups comprised in the water-based anionic polyurethane dispersion is a reaction product of an isocyanate-functional polyurethane polymer having anionic groups with a chain extender. The chain-extension reaction takes place during the manufacturing process of the polyurethane dispersion.

Without wishing to be bound to any theory it is assumed that the water based PUD includes dispersed "spheres" or particles of the polymer having anionic groups on the surface stabilized by counter cations. As the water evaporates from the PUD after application, said "spheres" or particles coalesce to form a continuous layer.

As will be described later, the invention also relates to a multilayer coating system comprising a base coating composition, wherein the base coating composition comprises an isocyanate-functional polyurethane polymer. In the following a general description of features of suitable isocyanate-functional polyurethane polymers will be given which apply to both the isocyanate-functional polyurethane polymer having anionic groups for the inventive coating composition and the isocyanate-functional polyurethane polymer of the base coating composition, unless otherwise stated. It is a matter of course that though the following description applies to both types of isocyanate-functional polyurethane polymer, the description of the types is entirely independent from each other, i.e. each of the described features of the two types may be the same or different.

Specific features related to either the isocyanate-functional polyurethane polymer having anionic groups for the inventive coating composition or to the isocyanate-functional polyurethane polymer of the base coating composition will be described thereafter.

An isocyanate-functional polyurethane polymer may be obtained from the reaction of at least one polyisocyanate with at least one polyol, whereby the isocyanate groups are in stoichiometric excess over the hydroxyl groups. The at least one polyisocyanate and the at least one polyol are brought to reaction via known methods, preferably at temperatures between 50 and 100° C., optionally by using a suitable catalyst. Preferably the at least one polyisocyanate is used in an amount corresponding to an isocyanate to hydroxyl group ratio in the range of 1.3 to 5, more preferably 1.5 to 3. Preferably the polyurethane polymer has a free NCO group content in the range of 1 to 10 weight-%, preferably 2 to 8 weight-%. Optionally the at least one polyol and the at least one polyisocyanate may be reacted in the presence of a plasticizer or a solvent which are free from isocyanate-reactive groups.

The isocyanate-functional polyurethane polymer is preferably a polyisocyanate-functional polyurethane polymer. Preferably the isocyanate-functional polyurethane polymer has an average isocyanate functionality in the range of 1.7 to 3, more preferably 1.8 to 2.5.

Suitable polyols for preparing the isocyanate-functional polyurethane polymer are polyether polyols, including those containing dispersed styrene-acrylonitrile (SAN), acrylonitrile-methylmethacrylate or urea particles, further polyester polyols such as products of the polycondensation reaction of diols or triols with lactones or dicarboxylic acids or their esters or anhydrides, further polycarbonate polyols, block copolymer polyols with at least two different blocks of polyether, polyester or polycarbonate units, polyacrylate and polymethacrylate polyols, polyhydroxy-functional fats and oils, especially natural fats and oils, and polyhydrocarbon polyols, such as polyhydroxy-functional polyolefins.

Along with the above-mentioned polyols, small amounts of low molecular weight divalent or multivalent alcohols can be used, such as 1,2-ethanediol, 1,2-propanediol, neopentyl glycol, dibromoneopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimer fatty alcohols, 1,1,1-trimethylolethane, 1,1,1-trimethylolpropane, glycerol, pentaerythritol, sugar alcohols, such as xylitol, sorbitol or mannitol, sugars, such as saccharose, other polyhydric alcohols, low molecular weight alkoxylation products of the above-mentioned divalent or multivalent alcohols, as well as mixtures of the above-mentioned alcohols.

Preferred polyols are diols and triols with an average molecular weight in the range of 500 to 6'000 g/mol, particularly in the range of 1'000 to 5'000 g/mol.

Preferred polyols are polyether polyols, polyester polyols, polycarbonate polyols and polyacrylate polyols.

Particularly preferred polyether polyols are polyoxyalkylenepolyols. Polyoxyalkylenepolyols are products of the polymerization of ethylene oxide, 1,2-propylene oxide, 1,2- or 2,3-butylene oxide, oxetane, tetrahydrofuran or mixtures thereof, optionally polymerized using a starter molecule with two or more active hydrogen atoms, such as water, ammonia or compounds with several OH- or NH-groups, such as 1,2-ethanediol, 1,2- and 1,3-propanediol, neopentylglycol, diethyleneglycol, triethyleneglycol, the isomeric dipropylene-glycols and tripropyleneglycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compounds.

Preferred are both polyoxyalkylenepolyols with a low degree of unsaturation (measured according to ASTM D-2849-69 and indicated in milliequivalents of unsaturation per gram of polyol (meq/g)), obtainable, for example, by using so-called double metal cyanide complex catalysts (DMC catalysts), and polyoxyalkylenepolyols with a higher degree of unsaturation, obtainable, for example, by using anionic catalysts such as NaOH, KOH, CsOH or alkali alcoholates. Particularly preferred polyoxyalkylenepolyols are polymerization products of ethylene oxide and/or propylene oxide.

More preferred are polyoxypropylenepolyols and so-called ethylene oxide endcapped polyoxypropylenepolyols. The latter are specific polyoxypropylene-po-lyoxyethylenepolyols obtainable by post-ethoxylating pure polyoxypropylenepolyols, thus featuring primary hydroxyl groups. These polyols enable good low temperature flexibility and good weathering properties.

Particularly preferred polyoxyalkylenepolyols are polyoxypropylenediols and -triols and ethylene oxide endcapped polyoxypropylenediols and -triols with an average molecular weight in the range of 500 to 6'000 g/mol, particularly in the range of 1'000 to 4'000 g/mol.

These polyether polyols provide a combination of low viscosity, good weathering properties and good mechanical properties.

Further particularly preferred polyols are polycarbonate polyols, particularly products of the polycondensation of dialkyl carbonates, diaryl carbonates or phosgene with diols or triols such as ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-octadecanediol, 1,4-cyclohexane dimethanol, dimeric fatty acid diol (dimeryl diol), hydroxypivalic neopentylglycol ester, glycerol and 1,1,1-trimethylolpropane.

Preferred low molecular weight alcohols are difunctional alcohols with a molecular weight in the range of 60 to 150 g/mol. Particularly preferred are 1,2-ethanediol, 1,3-propanediol, 1,4-butanediol, 1,5-pentanediol, 1,6-hexanediol, 1,3-cyclohexane dimethanol, 1,4-cyclohexane dimethanol and diethylene glycol. These alcohols improve particularly the strength of the coat. Most preferred is 1,4-butanediol.

Further preferred low molecular weight alcohols are difunctional bromated alcohols such as dibromoneopentyl glycol. These alcohols improve particularly the flame retarding properties of the coat.

Suitable polyisocyanates to obtain the isocyanate-functional polyurethane polymers are the following:

Aliphatic polyisocyanates, particularly 1,4-tetramethylene diisocyanate, 2-methylpentamethylene-1,5-diisocyanate, 1,6-hexanediisocyanate (HDI), 2,2,4- and 2,4,4-trimethyl-1,6-hexanediisocyanate (TMDI), 1,10-decane-diisocyanate, 1,12-dodecanediisocyanate, lysine or lysine ester diisocyanate, cyclohexane-1,3- and -1,4-diisocyanate, 1-methyl-2,4- and -2,6-diisocyanatocyclohexane and any mixtures of these isomers (HTDI or $H_6$TDI), 1-isocyanato-3,3,5-trimethyl-5-isocyanatomethyl-cyclohexane (isophorone-diisocyanate or IPDI), perhydro-2,4'- and -4,4'-diphenylmethane diisocyanate (HMDI or $H_{12}$MDI), 1,4-diisocyanato-2,2, 6-trimethylcyclohexane (TMCDI), 1,3- and 1,4-bis-(isocyanatomethyl)cyclohexane, m- and p-xylylene diisocyanate (m- and p-XDI), m- and p-tetramethyl-1, 3- and -1,4-xylylene diisocyanate (m- and p-TMXDI), bis-(1-isocyanato-1-methylethyl)naphthalene, dimer or trimer fatty acid isocyanates, such as 3,6-bis-(9-isocyanatononyl)-4,5-di-(1-heptenyl)cyclohexene (dimeryl diisocyanate), and $\alpha,\alpha,\alpha',\alpha',\alpha'',\alpha''$-hexamethyl-1,3,5-mesitylene triisocyanate. Preferred thereof are HDI, TMDI, IPDI and $H_{12}$MDI.

Aromatic polyisocyanates, particularly 4,4'-diphenylmethane diisocyanate, 2,4'-diphenylmethane diisocyanate and 2,2'-diphenylmethane diisocyanate and any mixtures of these isomers (MDI), 2,4- and 2,6-toluylene diisocyanate and any mixtures of these isomers (TDI), 1,3- and 1,4-phenylene diisocyanate, 2,3, 5,6-tetramethyl-1,4-diisocyanatobenzene, naphthalene-1,5-diisocyanate (NDI), 3,3'-dimethyl-4,4'-diisocyanatodiphenyl (TODI, dianisidine diisocyanate (DADI), 1,3,5-tris-(isocyanatomethyl)benzene, tris-(4-isocyanatophenyl)methane and tris-(4-isocyanatophenyl)thiophosphate. Preferred thereof are MDI and TDI. A particularly preferred form of MDI is an MDI iso-mer mixture comprising 4,4'-diphenylmethane diisocyanate and 2,4'-diphenylmethane diisocyanate in about equal amounts, commercially available e.g. as Desmodur® 2424 (from Bayer) or Lupranate® MI (from BASF).

Preferred polyisocyanates to obtain the isocyanate-functional polyurethane polymers are aliphatic polyisocyanates. The most preferred aliphatic polyisocyanate to obtain the isocyanate-functional polyurethane polymer is IPDI. Such polymers provide particularly low viscous coatings having high strength and high elongation.

In the following, specific or preferred features only related to the isocyanate-functional polyurethane polymer having acid groups and the polyurethane polymer having anionic groups based thereon of the inventive coating composition or related to the isocyanate-functional polyurethane polymer of the base coating composition will be described. If a statement of the above general description of both types of isocyanate-functional polyurethane polymer should contradict with the specific description below, the specific description is valid.

Isocyanate-Functional Polyurethane Polymer Having Anionic Groups

Particularly preferred polyols used for the isocyanate-functional polyurethane polymer having anionic groups are polyether polyols, particularly polyoxyalkylenepolyols, and in particular polycarbonate polyols. The benefit of polyurethane polymers based on polycarbonate polyols is that coatings with high strength, good mechanical and physical properties (i.e. resistance to abrasion, UV, heat and hydrolysis) are achieved.

Accordingly, the at least one water-based anionic polyurethane dispersion is preferably a water-based anionic polycarbonate polyurethane dispersion. That is, the polyurethane polymer having anionic groups is preferably a polyurethane polymer based on at least one polycarbonate polyol. The term "based on" here means according to conventional practice that the polyurethane polymer is obtainable by the reaction of monomers comprising at least one polycarbonate polyol. The same meaning applies mutatis mutandis in the present description and the appended claims for the term "based on" used with respect to polymers.

Preferred polyisocyanates to obtain the isocyanate-functional polyurethane polymers having anionic groups are aliphatic polyisocyanates. Preferred examples for the aliphatic polyisocyanates are H12MDI, IP DI, HDI. Polyurethane polymers based on aliphatic polyisocyanates provide coatings with a particularly good light-fastness, i.e. yellowing resistance under sunlight exposure, as well as good UV-resistance.

The isocyanate-functional polyurethane polymer having anionic groups is preferably a polymer based on at least one polyol comprising a polycarbonate polyol and at least one aliphatic polyisocyanate.

The anionic groups may be pendant groups or contained in pendant groups of the polyurethane. Suitable examples for the anionic groups are carboxylate groups or sulfonate groups, in particular carboxylate groups.

The counter ion of the anionic groups, such as carboxylate groups, may be any conventional counter ion, e.g. alkali metal ions, alkaline earth metal ions, $NH_4^+$ or organic ammonium ions. Organic ammonium ions having one or more organic groups, in particular alkyl groups, are preferred. Preferred examples of the cation used as counter ion are protonated tertiary amines which result from neutralization of acid groups to get the anionic groups as discussed below where suitable examples for the tertiary amines are also given.

In order to incorporate the anionic groups into the isocyanate-functional polyurethane polymer any method known to the skilled person may be used. The anionic groups may be incorporated by using at least one polyol having an acid group instead or preferably in addition to the at least one polyol described above for preparing the polyurethane polymer and neutralizing the acid groups of the polyurethane polymer obtained at least in part. The acid group may be e.g. a sulfonic acid group or preferably a carboxylic acid group.

Accordingly, the isocyanate-functional polyurethane polymer having anionic groups is preferably obtainable by reacting
  at least one first polyol,
  at least one polyol having an acid group, which is different from the first polyol, and
  at least one polyisocyanate,
To obtain an isocyanate-functional polyurethane polymer having acid groups which are subsequently neutralized at least in part with a base to achieve anionic groups.

As to the at least one first polyol and as to the at least one polyisocyanate reference is made to the polyols and polyisocyanates described above. As mentioned, the at least one first polyol preferably comprise or is a polyether polyol or more preferably a polycarbonate polyol and/or the at least one polyisocyanate preferably is at least one aliphatic polyisocyanate.

The at least one polyol having an acid group is preferably a diol having a carboxylic or sulfonic acid group, preferably a carboxyl group. Particularly preferred is dimethylol propionic acid (DMPA) or dimethylol butanoic acid (DMBA).

The acid groups of the isocyanate-functional polyurethane polymer obtained, preferably carboxyl groups, are at least partly neutralized with a suitable base and converted into anionic groups, in particular carboxylate groups. The neutralization typically takes place after the reaction of the polyols and the polyisocyanates is completed and before the isocyanate-terminated polyurethane prepolymer is mixed with water.

Examples of suitable bases for neutralization are tertiary amines such as trimethylamine, triethylamine, triisopropylamine N,N-dimethylethanolamine, N-me-thyldiethanolamine, N-methyldiisopropanolamine, dimethylisopropanolamine, N-methylmorpholine, N-ethylmorpholine or triethanolamine, or alkali metal hy-droxides such as lithium hydroxide, sodium hydroxide, or potassium hydroxide or mixtures thereof.

Preferred thereof are trimethylamine, triethylamine, n-ethyl morpholine or methyl diethanolamine or mixtures thereof. Particularly preferred is triethylamine.

Isocyanate-Functional Polyurethane Polymer of the Base Coating Composition

With respect to the isocyanate-functional polyurethane polymer of the base coating composition, particularly preferred polyols are polyether polyols, particularly polyoxyalkylenepolyols, preferably polyoxypropylenepolyols or polyoxypropylenepolyoxyethylenepolyols. These polyols help to develop good low temperature flexibility in the cured coating.

Preferably the isocyanate-functional polyurethane polymer of the base coating composition is prepared from a polyol mixture containing at least 50 weight-%, more preferably at least 80 weight-%, and most preferably at least 90 weight-%, of polyether polyols.

In a particularly preferred embodiment, the isocyanate-functional polyurethane polymer is obtained from a combination of at least one polyether polyol with a molecular weight in the range of 500 to 6'000 g/mol and at least one diol with a molecular weight in the range of 60 to 150 g/mol, particularly 1,4-butanediol. Such an isocyanate-functional polyurethane polymer shows a low viscosity and provides good mechanical properties, particularly high strength.

Preferred polyisocyanates to obtain the isocyanate-functional polyurethane polymers of the base coating composition are aliphatic polyisocyanates. The most preferred aliphatic polyisocyanate to obtain the isocyanate-functional polyurethane polymer is IPDI. Such polymers provide particularly low viscous coatings having high strength and high elongation.

In one embodiment of the invention, preferred polyisocyanates to obtain the isocyanate-functional polyurethane polymer of the base coating composition are aromatic polyisocyanates, in particular TDI or MDI. TDI leads to low viscosity and low monomer polymers since it has different reactivity of the two isocyanate groups, thus allowing for selective addition reaction. MDI is preferred from an EHS (environment/health/safety) point of view since it has a very low volatility. Moreover MDI is inexpensive and affords fast curing properties and high strength coatings.

Preferably the isocyanate-functional polyurethane polymer of the base coating composition has an average molecular weight in the range of 1'000 to 10'000 g/mol, more preferably in the range of 1'000 to 5'000 g/mol.

Coating Composition

The polyurethane polymer having anionic groups comprised in the water-based anionic polyurethane dispersion is a reaction product of an isocyanate-functional polyurethane polymer having anionic groups with a chain extender. The chain extender may be selected from at least one of water, inorganic or organic polyamines having an average of about two or more primary and/or secondary amine groups, amine functional polyoxyalkylenes, ureas, or their combinations, wherein polyamines are preferred. Particularly preferred are diamines with two primary and/or secondary amine groups. Polyamines as used herein also refer to polyhydrazines, in particular dihydrazides. The polyamine is preferably a linear or branched alkylenediamine, e.g. a linear or branched $C_{2-12}$-alkylenediamine, or a cycloalkane or alkyl substituted cycloalkane having two amine groups.

Examples of preferred chain extenders are water, ethylenediamine (EDA), 2-methylpentamethylenediamine (MPMD), hexamethylenediamine (HDA), 1,3-bis(aminomethyl)benzene (MXDA), isophoronediamine (IPDA), hydrazine, adipic dihydrazide (ADH) or any desired combination of these chain extenders. Most preferred are water, EDA, MPMD or combinations thereof.

The water-based anionic polyurethane dispersion contained in the inventive coating composition is usually stable at neutral or alkaline pH values. Anionic PUD are commercially available.

The coating composition of the invention is an aqueous coating composition having a neutral or alkaline pH-value. The coating composition may have e.g. a pH-value of 7 to 9.5, preferably 7 to 8.5, wherein the pH is more preferable greater than 7 to 8.5.

The coating composition further comprises 0.1 to 4 weight-%, preferably 0.15 to 1.5 weight-%, of nanoparticulate $TiO_2$ having an average particle size of not more than 100 nm, based on the solids content of the coating composition. The solids content of the coating composition includes the nanoparticulate $TiO_2$. The nanoparticulate $TiO_2$ has preferably an average particle size in the range of 5 to 100 nm, more preferably in the range of 5 to 40 nm. The nanoparticulate $TiO_2$ is preferably transparent. The nanoparticulate $TiO_2$ may optionally include modifications such as inorganic coating, e.g. alumina or silica coatings, organic surface modification and/or a crystal lattice doping. A wide variety of suitable nanoparticulate $TiO_2$ is commercially available. Commercial grades of titanium dioxide often have inorganic and in some cases organic surface treatments as mentioned above. As examples of suitable commercial nanoparticulate $TiO_2$ Hombitec®RM 110 from Huntsman, Aeroxide®TiO2 P 25 from Evonik Industries, may be mentioned.

It is preferred that the nanoparticulate $TiO_2$ is not organically modified at the surface. Organic modification may refer to coatings of organic compounds on the particle or to organic compounds attached to the particle, respectively.

The presence of said nanoparticulate titanium dioxide in the amounts defined in the coating composition surprisingly reduces discolouration or yellowing in a multilayer system after UV weathering and also improves cleanability of the surface, when said coating composition is used as the top coat in a multilayer system. The used amount of $TiO_2$ is at a level where the greatest amount of visible light transmission is possible but surprisingly also with the minimum level of discolouration to the underlying substrate.

The coating composition may comprise at least one organic solvent, in particular an organic solvent able to promote film formation. Such an organic solvent may also be called a "coalescing agent" or "coalescent". It is preferred that the coating composition comprises at least one coalescent. The at least one coalescent may be contained in the water-based anionic PUD as mentioned above and/or added as separate ingredient to the coating composition.

Examples of suitable coalescents are N-alkylpyrrolidones such as N-methyl-pyrrolidone (NMP) or N-ethyl-pyrrolidone (NEP), glycol ethers such as dipropylene glycol methyl ether (DPM), glycol ether acetates such as dipropylene glycol methyl ether acetate (DPMA), etheracetals such as 2,5,7,10-tetraoxaundecane (TOU), etheramides such as 3-methoxy-N,N-dimethylpropionamide and dimethylsulphoxide (DMSO). Other than a coalescent the coating composition may contain further organic solvents, in particular the organic solvents mentioned below as additives for the base coating composition so that reference is made thereto.

The coating composition may optionally comprise one or more additives, which are common for PUDs, in particular for PUDs used as coating compositions. Examples of suitable further additives are defoamers, surfactants, rheological additives, thickening agents, biocides, waxes, matting agents, substrate wetting and levelling agents.

In one preferred embodiment at least one matting agent is contained in the coating composition in order to achieve a matt appearance of the coating surface. Matting agents are commercially available. Examples are silica-based matting agents.

It is preferred that the coating composition does not include a curing agent. It is also preferred that the coating composition does not include a metal-based catalyst. Curing agents and metal-based catalysts here refer to compounds which can accelerate isocyanate reactions.

The coating composition contains the at least one water-based anionic polyurethane dispersion preferably in an amount of 75 to 85 weight-%, based on the total weight of the coating composition. The at least one water-based anionic polyurethane dispersion here refers to the total amount of polyurethane polymer having anionic groups and water contained in the coating composition.

If the coating composition comprises at least one organic solvent, the amount of the at least one organic solvent is preferably in the range of 2.5 to 7.5 weight-%, based on the total weight of the coating composition.

If matting agent is contained, the amount of the at least one matting agent is preferably in the range of 1 to 3 weight-%, based on the total weight of the coating composition.

The coating composition according to the invention is preferably a clear coating composition. The coating obtained from said coating composition is preferably a translucent or transparent coat or top coat, preferably a transparent top coat. The coating composition is typically liquid or pourable. The coating composition is particularly suitable as a top coating composition.

Multilayer Coating System

In a further embodiment the invention relates to a multilayer coating system on a substrate, comprising
  a top coat which is a cured coating composition, wherein
    the coating composition is according to the invention as described above, and
  one or more base coats which are a cured base coating composition, wherein the base coating composition comprises an isocyanate-functional polyurethane polymer.

The base coating composition may be a one-part or two-part system, wherein the base coating composition is preferably a one-part system. The base coating composition is preferably a one-part moisture-curing coating composition. The base coating composition may be a water-based coating composition or an organic solvent-based coating composition. Also the water-based coating composition may typically comprise organic solvent. The base coating composition is typically liquid or pourable. The following description generally applies to all possible base coating compositions, where applicable, in particular for the preferred one-part moisture-curing base coating composition.

The base coating composition comprises an isocyanate-functional polyurethane polymer. The isocyanate-functional polyurethane polymer of the base coating composition has been described above so that reference is made thereto. As indicated, the isocyanate-functional polyurethane polymer of the base coating composition may be based one at least one aromatic polyisocyanate or is based on at least one aliphatic polyisocyanate, wherein aliphatic polyisocyanate is preferred. The reduced yellowing and improved cleanability observed in the inventive multilayer coating systems is more significant when the polyurethane of the base coat is based on an aliphatic polyisocyanate.

Preferably the content of the isocyanate-functional polyurethane polymer in the base coating composition is in the range of 15 to 50 weight-%, more preferably 15 to 40 weight-%. This enables coatings with good durability and good mechanical properties.

The base coating composition optionally and preferably comprises at least one organic solvent. While it is usually desired to have coating composition with a low VOC content, a certain amount of organic solvent is often required, e.g. in order to achieve a viscosity of the composition suitable for application. Suitable examples for the organic solvent are hydrocarbons, esters or ethers, particularly acetyl acetone, mesityloxide, cyclohexanone, methylcyclo-hexanone, ethyl acetate, propyl acetate, 1-methoxy-2-propylacetate, butyl acetate, diethyl malonate, diisopropylether, diethylether, dibutylether, ethylene glycol diethylether, diethylene glycol diethylether, 2,5,7,10-tetraoxaundecane, toluene, xylenes, heptanes, octanes, diisopropylnaphthalenes and petroleum fractions, such as naphtha, white spirits and petroleum ethers, such as Solvesso™ solvents (from Exxon), hydrogenated aromatic solvents such as hydrogenated naphtha, methylene chloride, propylene carbonate, butyrolactone, N-methyl-pyrrolidone and N-ethyl-pyrrolidone.

The base coating composition optionally and preferably comprises at least one curing agent. One-part systems often comprise curing agents in the form of blocked amine hardeners, in particular oxazolidines or aldimines, to prevent excessive gassing from carbon dioxide formation on curing, which is a highly undesired property. On the other hand, said curing agents intensify the problem of yellowing in these systems due to leaving groups, in particular aldehydes. The inventive multilayer coating system is particular suitable for systems in which such curing agents are contained in the base coat, because the inventive effect of reduced yellowing is much more pronounced and can overcome the particular problem occurring in such systems.

The at least one curing agent is preferably at least one aldimine and/or at least one oxazolidine. The curing agent may be monofunctional or preferably polyfunctional aldimine or oxazolidine, preferably a dialdimine or a trialdimine. It is particular preferred that the at least one curing agent is a combination of a dialdimine and a trialdimine.

The aldimine is preferably an aldimine having quaternary carbon atoms in alpha position to the aldimine group carbon atoms. Such aldimines provide base coating compositions with good shelf life stability.

A preferred aldimine is an aldimine of the formula (I)

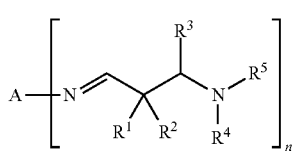

(I)

wherein
n is 2 or 3,
A is an n-valent hydrocarbyl moiety of molecular weight in the range of 28 to 5'000 g/mol optionally containing ether groups,
$R^1$ and $R^2$ are the same or different $C_1$ to $C_{12}$ linear or branched alkyls, or are joined together to form a divalent linear or branched $C_4$ to $C_{12}$ hydrocarbyl moiety which is part of a 5- to 8-membered carbocyclic ring, $R^3$ is hydrogen or a linear or branched $C_1$ to $C_{12}$ alkyl or arylalkyl or alkoxycarbonyl, and
$R^4$ and $R^5$ are the same or different linear or branched $C_1$ to $C_{20}$ alkyl or cycloalkyl or aralkyl optionally containing ether groups, or are joined together to form a divalent linear or branched $C_4$ to $C_{12}$ hydrocarbyl moiety which is part of a 5- to 8-membered heterocyclic ring which, besides the nitrogen atom, may contain an ether or thioether or tertiary amino group.

Preferably $R^1$ and $R^2$ are each methyl. This provides coating composition having low viscosity as well as fast, reliable curing properties.

Preferably $R^3$ is hydrogen. This provides coating compositions having low viscosity as well as fast, reliable curing properties.

Preferably $R^4$ and $R^5$ are each a linear or branched $C_1$ to $C_8$ alkyl or cycloalkyl or aralkyl optionally containing ether groups, or are joined together to form a divalent linear or branched $C_4$ to $C_8$ hydrocarbyl moiety which is part of a 5- to 8-membered heterocyclic ring which, besides the nitrogen atom, may contain an ether or thioether or tertiary amino group.

More preferably $R^4$ and $R^5$ are each a methoxyethyl group or are joined together to form, including the nitrogen atom, a morpholine or a 2,6-dimethylmorpholine ring.

Most preferably $R^4$ and $R^5$ form a morpholine ring together with the nitrogen atom.

These aldimines provide base coating compositions with a very good shelf life stability, fast curing properties and high strength.

Particularly preferred are aldimines of the formula (I) wherein $R^1$ and $R^2$ are methyl, $R^3$ is hydrogen and $R^4$ and $R^5$ form a morpholine ring together with the nitrogen atom.

Preferably A is the moiety remaining when removing the primary amino groups of a polyoxypropylene triamine with an average molecular weight in the range of 380 to 5'000 g/mol, commercially available e.g. as Jeffamine® T-403 (from Huntsman), Polyetheramine T 403 (from BASF) or PC Amine® TA 403 (from Nitroil), or as Jeffamine®T-5000 (from Huntsman), Polyetheramine T 5000 (from BASF) or PC Amine® TA 5000 (from Nitroil).

More preferably A is the moiety remaining when removing the primary amino groups of a polyoxypropylene triamine with an average molecular weight in the range of 380 to 500 g/mol, commercially available e.g. as Jeffamine®T-403 (from Huntsman), Polyetheramine T403 (from BASF) or PC Amine® TA 403 (from Nitroil).

Such aldimines of formula (I) are trialdimines and provide base coating compositions having fast curing properties, good mechanical properties, particularly high flexibility, and high durability.

A particularly preferred trialdimine of the formula (I) is N,N',N"-tris(2,2-dimethyl-3-(N-morpholino)-propylidene)-polyoxypropylene triamine with an average molecular weight in the range of 860 to 5'500 g/mol, particularly 860 to 960 g/mol.

Preferably, A is the moiety remaining when removing the primary amino groups of a diamine selected from the group consisting of hexamethylene-1,6-diamine, 2-methylpentane-1,5-diamine, 3-aminomethyl-3,5,5-trimethylcyclohexylamine (isophoronediamine), 2,2,4- and 2,4,4-trimethylhexamethylenediamine, 1,3-bis(aminomethyl)benzene, 1,3-bis(aminomethyl)cyclohexane, 1,4-bis(aminomethyl)cyclohexane, bis(4-aminocyclohexyl)methane, bis(4-amino-3-methylcyclohexyl)methane, 2,5(2,6)-bis-(aminomethyl)bicyclo[2.2.1]heptane, 3(4),8(9)-bis(aminomethyl)-tricyclo[5.2.1.0$^{2,6}$]decane, 1,2-diaminocyclohexane, 1,3-diaminocyclohexane, 1,4-diaminocyclohexane, 2,2,6-trimethylcyclohexane-1,4-diamine, 3,6-dioxaoctane-1,8-diamine, 4,7-dioxadecane-1,10-diamine and 4-aminomethyl-1,8-octanediamine, 1,3-phenylene diamine, 1,4-phenylene diamine, 2,4- and 2,6-toluylene diamine and 4,4'-, 2,4'- and 2,2'-diaminodiphe-nylmethane.

Such aldimines of formula (I) are dialdimines and provide coating compositions with a long shelf life stability, low viscosity, fast curing properties and a particularly high strength.

Preferred dialdimines of the formula (I) are selected from the group consisting of N,N'-bis(2,2-dimethyl-3-(N-morpholino)-propylidene)-hexamethylene-1,6-diamine and N,N'-bis(2,2-dimethyl-3-(N-morpholino)-propylidene)-3-aminome-thyl-3,5,5-trimethylcyclohexylamine. These dialdimines provide a particularly high strength.

Particularly preferred is N,N'-bis(2,2-dimethyl-3-(N-morpholino)-propylidene)-3-aminomethyl-3,5,5-trimethylcyclohexylamine. This dialdimine provides very fast cure speed, especially in combination with the preferred trialdimine, allowing a fast time to be walkable of a freshly applied membrane.

Another preferred aldimine is an aldimine of the formula (II),

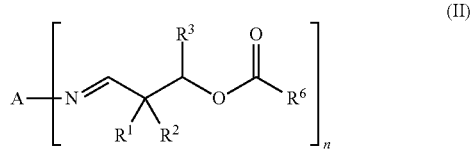

wherein
R$^6$ is a monovalent C$_1$ to C$_{20}$ hydrocarbyl moiety optionally containing ether, carbonyl or ester groups,
and n, A, R', R$^2$ and R$^3$ have the already mentioned meanings.

These aldimines provide coating compositions with a long shelf life stability, a particularly low viscosity, fast curing properties, high strength and a particularly high elongation.

Preferably R$^6$ is methyl. Such aldimines provide low odour coating compositions with low viscosity, long shelf life stability, a fast skinning time and a particularly high strength.

Preferably R$^6$ is C$_{11}$ alkyl. These dialdimines provide odourless coating compositions having long shelf life stability, low viscosity and high flexibility at low temperatures.

Preferred aldimines of the formula (II) are dialdimines selected from the group consisting of N,N'-bis(2,2-dimethyl-3-acetoxypropylidene)-hexamethylene-1,6-diamine, N,N'-bis(2,2-dimethyl-3-acetoxypropylidene)-3-aminomethyl-3,5,5-trimethylcyclohexylamine, N,N'-bis(2,2-dimethyl-3-lauroyloxypropylidene)-hexamethylene-1,6-diamine and N,N'-bis(2,2-dimethyl-3-lauroyloxypropylidene)-3-aminomethyl-3,5,5-trimethylcyclohexylamine. These dialdimines provide low viscosity and low odour, a fast skinning time, long shelf life stability and high elongation combined with good strength.

In a particularly preferred embodiment of the invention the substituents R$^1$, R$^2$ and R$^3$ in the formula (I) are the same as in the formula (II).

In a particularly preferred embodiment of the invention the substituents R$^4$ and R$^5$ in the formula (I) are the same as in the formula (II).

The aldimines of the formula (I) are preferably available from a condensation reaction of at least one primary amine of the formula (IV) and at least one aldehyde of the formula (V a). The aldimines of the formula (II) are preferably available from a condensation reaction of at least one primary amine of the formula (IV) and at least one aldehyde of the formula (V b).

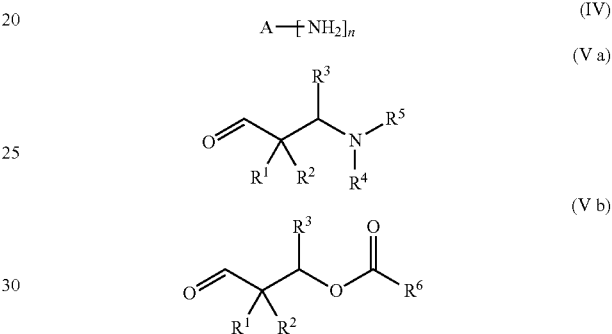

In the formulae (IV), (V a) and (V b), n, A, R$^1$, R$^2$, R$^3$, R$^4$, R$^5$ and R$^6$ have the already mentioned meanings.

For these condensation reactions, the aldehyde of the formula (V a) or of the formula (V b) is used stoichiometrically or in excess related to the primary amino groups of the primary amine of the formula (IV). The reaction can advantageously be conducted at a temperature in the range between 15 and 120° C., either in the presence of a solvent or without a solvent. The released water is being removed either azeotropically with a suitable solvent, or directly under vacuum.

The base coating composition preferably comprises a trialdimine of the formula (I) and a dialdimine of the formula (I) in a specific ratio, such that the ratio between the number of the aldimino groups of the trialdimine and the number of aldimino groups of the dialdimine is in the range of 90/10 to 40/60. In this ratio range, the coating composition features fast curing properties and high strength at high elongation. Outside of the claimed ratio range the coating composition cures much slower. Preferably the ratio between the number of the aldimino groups of the trialdimine and the number of aldimino groups of the dialdimine is in the range of 90/10 to 60/40. In this range the coating has a very fast time to be walkable.

Preferably the total aldimine content in the base coating composition is such that the ratio between the total number of aldimino groups to the number of isocyanate groups is in the range of 0.3 to 1.0, preferably 0.4 to 0.9, more preferably 0.6 to 0.8. In this range, the coating cures quickly without the formation of bubbles or blisters to a flexible material of high strength.

Alternatively, the curing agent optionally contained in the base coating composition may be at least one oxazolidine. The oxazolidine is preferably a bis-oxazolidine. Oxazolidines, particularly bis-oxazolidines, are well known as curing agents for polyurethanes. Particularly useful as curing agents are bis-oxazolidines which are linked by urethane groups, disclosed for example in U.S. Pat. Nos. 5,747,627, 5,189,176 and GB 1 463 944. A further class of oxazolidines are bis-oxazolidines which are linked by carbonato groups. Such bis-oxazolidines are disclosed for example in EP 0 499 188 A1. A further class of oxazolidines are bicyclic oxazolidines which are disclosed for example in U.S. Pat. No. 5,126,421, WO 96/08308 A1, WO 99/07762 A1 and GB 1 292 455. The at least one oxazolidine is preferably a composition comprising at least one bis-oxazolidine having at least two urethane groups and at least one bis-oxazolidine having at least one carbonato group. This system is defined in EP 2 327 733 A1 to which reference is made for further details.

Besides the ingredients already mentioned, the base coating composition may comprise further ingredients selected from at least one of fillers, pigments, flame-retarding fillers, flame-retarding plasticizers, polyisocyanate crosslinkers, metal-based catalysts, acid catalysts and UV-stabilizers.

Preferably the base coating composition comprises at least one filler. Fillers help to develop strength and durability.

Preferred fillers are inorganic fillers, particularly calcium carbonate ("chalk"), such as ground calcium carbonate (GCC) and precipitated calcium carbonate (PCC), barium sulfate (barytes), slate, silicates (quartz), magnesiosilicates (talc), alumosilicates (clay, kaolin), dolomite, mica, glass bubbles and silicic acid, in particular highly dispersed silicic acids from pyrolytic processes (fumed silica). These fillers may or may not carry a surface coating, e.g. a stearate or siloxane coating.

Further preferred fillers are organic fillers, particularly carbon black and micro-spheres.

Preferably the base coating composition further comprises at least one colour pigment. The colour pigment defines the colour of the coat, helps to develop strength and increases durability. Preferred colour pigments are titanium dioxide, iron oxides and carbon black. It should be noted that a certain particle size is required to confer a colouring effect to a pigment. Particles below a certain particle size which may depend on the particle type have no colouring effect.

Preferably the base coating composition further comprises at least one flame-retarding filler. Preferred flame-retarding fillers are aluminum trihydroxide (ATH), magnesium dihydroxide, antimony trioxide, antimony pentoxide, boric acid, zinc borate, zinc phosphate, melamine borate, melamine cyanurate, ethylenediamine phosphate, ammonium polyphosphate, di-melamine orthophos-phate, di-melamine pyrophosphate, hexabromocyclododecane, decabromodi-phenyl oxide and tris(bromoneopentyl) phosphate.

Preferably the base coating composition further comprises at least one flame-retarding plasticizer, particularly a phosphate or a phosphonate, particularly triphenyl phosphate (TPP), diphenyl-tert.butylphenyl phosphate, diphenyl-cresyl phosphate (DPK), tricresyl phosphate (TKP), triethyl phosphate, tris(2-ethylhexyl) phosphate, diphenyl-2-ethyl-hexyl phosphate (DPO), tris(2-ethylhexyl) phosphate (TOF), diphenylisodecyl phosphate, dimethyl propane phosphonate (DMPP), tetraphenyl resorcinol diphosphate, resorcinol diphosphate oligomer (RDP), ethylenediamine diphosphate, as well as chloroalkyl phosphate esters such as tris(1-chloro-2-propyl) phosphate, tris(1,3-dichloro-2-propyl) phosphate and 2,2-bis(chloromethyl)trimethylene bis (bis(2-chloroethyl)phosphate).

Preferably the base coating composition further comprises at least one polyisocyanate crosslinker with an NCO-functionality of greater than two, particularly oligomers, polymers or derivatives of the already mentioned diisocyanates. Preferred aliphatic polyisocyanate crosslinkers are HDI-biurets, such as Desmodur® N 100 and N 3200 (from Bayer), Tolonate® HDB and HDB-LV (from Rhodia) and Duranate® 24A-100 (from Asahi Kasei); HDI-isocyanurates, such as Desmodur® N 3300, N 3600 and N 3790 BA (from Bayer), Tolonate® HDT, HDT-LV and HDT-LV2 (from Rhodia), Duranate® TPA-100 and THA-100 (from Asahi Kasei) and Coronate® HX (from Nippon Polyurethane); HDI-uret-diones, such as Desmodur® N 3400 (from Bayer); HDI-iminooxadiazinediones, such as Desmodur® 3900 (from Bayer); HDI-allophanates, such as Desmodur® VP LS 2102 (from Bayer) and Basonat® HA 100, Basonat® HA 200 and Basonat® HA 300 (all from BASF); IPDI-isocyanurates, such as Desmodur® Z 4470 (from Bayer) and Vestanat® T1890/100 (from Evonik); mixed isocyanurates based on IPDI/HDI, such as Desmodur® NZ 1 (from Bayer). Preferred aromatic polyisocyanate crosslinkers are TDI-oligomers, such as Desmodur® IL (from Bayer); modified MDI containing carbodiimides or uretonimines of MDI, such as the already mentioned ones. Mixed aromatic/aliphatic polyisocyanate crosslinkers may also be used, in particular isocyanurates based on TDI/HDI, such as Desmodur® HL (from Bayer).

Aliphatic polyisocyanate crosslinkers are particularly preferred in base coating composition containing isocyanate-functional polyurethane polymers based on aliphatic polyisocyanates.

Particularly preferred are IPDI-isocyanurates and mixed isocyanurates containing IPDI.

Preferably the base coating composition further comprises at least one metal-based catalyst accelerating the reaction of the isocyanate groups. Preferred metal-based catalysts are dialkyltin complexes, particularly dimethyltin, dibutyltin or dioctyltin carboxylates, mercaptides or acetoacetonates, such as DMTDL, DBTDL, DBT(acac)$_2$, DOTDL, dioctyltin(IV)neodecanoate or DOT(acac)$_2$, bismuth(III) complexes, such as bismuth(III)octoate or bismuth-(III)neodecanoate, zinc(II) complexes, such as zinc(II) octoate or zinc(II)neodecanoate, and zirconium(IV) complexes, such as zirconium(IV)octoate or zirconium(IV) neodecanoate.

Preferably the base coating composition further comprises at least one acid catalyst. An acid catalyst can accelerate the hydrolysis of the aldimino groups, if contained. Preferred acid catalysts are carboxylic acids and sulfonic acids, particularly aromatic carboxylic acids, such as benzoic acid or salicylic acid.

Preferably the base coating composition further comprises at least one UV-stabilizer. Preferred UV-stabilizers are UV-absorbers, such as benzophenones, benzotriazoles, oxalanilides, phenyltriazines and particularly 2-cyano-3,3-di-phenylacrylic acid ethyl ester, and hindered amine light stabilizers (HALS), such as bis(1,2,2,6,6-pentamethyl-4-piperidyl) sebacate and other compounds containing at least one 1,2,2,6,6-pentamethyl-4-piperidinyl moiety. UV-stabilizers help to prevent the polymer from degradation under light exposure.

The base coating composition may further comprise at least one of the following ingredients:
  other polyisocyanates, such as other isocyanate-functional polyurethane polymers, particularly those based on MDI, TDI, IPDI or HDI;
  blocked amine hardeners other than those mentioned;

plasticizers other than phosphates and phosphonates, particularly phthalates, trimellitates, succinates, glutarates, adipates, sebacates, azelates, citrates, benzoates, acetylated glycerin or monoglycerides, hydrogenated phthalates, fatty acid esters, arylsulfonates or hydrocarbon resins;

additives, such as wetting agents, flow enhancers, levelling agents, defoamers, deaerating agents, drying agents, antioxidants, adhesion promoters, rheology modifiers, particularly fumed silica, and biocides.

Preferably the base coating composition comprises at least one ingredient selected from the group consisting of inorganic fillers and pigments.

Preferably the base coating composition has a filler content in the range of 20 to 80 weight-%, more preferably in the range of 30 to 60 weight-%, the filler including inorganic, organic and flame-retarding fillers and pigments. At this filler content the base coat obtained provides high strength and durability.

Preferably the base coating composition has a low viscosity. This enables a good workability when applied as a self-levelling coating. Particularly the base coating composition has a Brookfield viscosity in the range of 2'000 to 15'000 mPa·s at 20° C., preferably in the range of 2'000 to 10'000 mPa·s at 20° C. Preferably the base coating composition has a low organic solvent content; most preferably it contains 50 g VOC per liter or less. At such low solvent content the membrane fulfills toughest VOC specifications, e.g. those of the South Coast Air Quality Management District.

Suitable substrates onto which the multilayer coating system of the invention can be applied are particularly concrete, lightweight concrete, mortar, brick, adobe, tile, slate, gypsum and natural stone, such as granite or marble;

metals and alloys, such as aluminium, copper, iron, steel, nonferrous metals, including surface-finished metals and alloys, such as galvanized metals and chromeplated metals;

asphalt;

bituminous felt;

plastics, such as PVC, ABS, PC, PA, polyester, PMMA, SAN, epoxide resins, phenolic resins, PUR, POM, PO, PE, PP, EPM, EPDM in untreated form or surface treated by means of plasma, corona or flame; particularly PVC, PO (FPO, TPO) or EPDM membranes;

coated substrates, such as varnished tiles, painted concrete and coated metals.

A particularly preferred substrate is concrete, e.g. concrete balcony slabs. It can be advantageous to pre-treat the substrate before applying coats of the multilayer coating system, for example by washing, pressure-washing, wiping, blowing off, grinding and/or applying a primer and/or an undercoat.

The base coat of the multilayer coating composition is obtained by applying the base coating composition on the substrate or on a part of the multilayer coating system already applied on the substrate and curing the base coating composition.

In the case of two-part system, the two parts of the base coating composition (isocyanate part and hardener part) are mixed before application. The curing starts after mixing.

In the case of the preferred one-part moisture curing systems, the curing of the base coating composition starts when it gets in contact with moisture, typically atmospheric moisture. The curing process works by chemical reaction. When a curing agent is present in the composition as is preferred, the curing agent is activated with moisture to generate reactive species which then react with isocyanate groups. For instance, on activation, each aldimino group of an aldimine curing agent forms a primary amino group as reactive species. Furthermore, the isocyanate groups can also react directly with moisture, i.e. water. The latter reaction is the main curing mechanism for base coating compositions not containing curing agent. Said latter reaction may be accelerated, e.g. by a metal-based catalyst.

As a result of these reactions, the base coating composition cures to a solid material, preferably a solid, elastic material. The curing process may also be called crosslinking.

The top coat of the multilayer coating composition is obtained by applying the inventive coating composition on the underlying part of the multilayer coating system already applied on the substrate and curing the coating composition.

The curing of the inventive coating composition after application is simply effected by evaporation of water and optional organic solvent contained therein whereby polyurethane particles of the PUD coalesce resulting in film formation. Thus, curing of the coating is essentially or mainly a physical process caused by solvent removal. It is also possible that there is a certain crosslinking taking place during or after the physical drying. Such crosslinking may be caused by reaction of functional groups of the polyurethane, in particular carbonic acid groups, with functional groups from crosslinkers, such as isocyanate, carbodiimide, oxazoline or aziridine groups. In the aqueous coating composition to be applied this reaction is hindered or slowed down because of the neutral to basic pH conditions which may change upon removal of solvents which may also cause removal of basic compounds generated from the cationic counter ion groups of PUD.

As a result, the inventive coating composition cures to a solid material of sufficient strength, preferably a solid, elastic material.

The layer thickness of base coat and top coat may be designed as needed. The thickness of the base coat is e.g. typically in the range of 0.5 to 3 mm, particularly 0.75 to 1.5 mm. The thickness of the top coat is e.g. typically in the range of 0.05 to 0.3 mm, particularly 0.1 to 0.2 mm.

The top coat may have a glossy or matt surface. The top coat is preferably translucent or transparent, more preferably transparent. The transparency of the top coat, as determined by the method of the experimental part below, is preferably less than 10, more preferably less than 8, and still more preferably less than 7.

The inventive multilayer coating system is preferably a decorative multilayer coating system, wherein the top coat is preferably translucent or transparent. The term "decorative" here means in particular that the part of the multilayer coating system underlying the top coat is coloured, preferably coloured and opaque. It should be noted that colour here also includes white colour and black colour.

In this regard, it is preferred that at least one base coat comprises a colour pigment and/or the multilayer coating system includes colour chips and/or colour quartz sand. Colour chips are typically plastic chips. The colour chips and/or colour quartz sand may be contained in the base coat or another coat of the multilayer coating system. Alternatively, the colour chips and/or colour quartz sand may be scattered onto a freshly applied (still wet) base coat or other coat of the multilayer coating system. The latter procedure is usually preferred for coloured chips. For instance, the base coat can be broadcast with acrylic decorative flakes.

The multilayer coating system may optionally comprise further layers and/or components such as primers, e.g. an epoxy resin, undercoats or other coats as well as reinforcement components such as a fibre reinforcement mesh. The fibre reinforcement mesh is preferably a non-woven polyester fibre mesh and more preferably a non-woven glass fibre mesh.

Reinforcement components are usually placed in a freshly applied coating composition, typically a base coating composition. The reinforcement component, if used, is preferably located between two base coat layers.

Only as an exemplary embodiment, a typical multilayer coating system according to the invention may have the following structure (in this order):
- a primer on the substrate such as a concrete substrate;
- a first base coat;
- a reinforcement component, in particular a fibre reinforcement mesh;
- a second base coat;
- a primer with quartz sand scattered thereon;
- a top coat as finish.

Both the one or more base coating compositions and the inventive coating composition are subsequentially applied in liquid or pourable state within its open time, typically by pouring it onto the substrate or on the part of the multilayer coating system already applied on the substrate, followed by spreading it, e.g. with a roller, a brush or a squeegee. Another application option for the base coat is by spraying.

"Open time" means herein the period of time between the exposure to moisture for the base coat or application for the top coat, and the formation of a skin on the surface of the membrane, also called "tack-free time" or "skinning time". Both the base coating compositions and the inventive coating composition are preferably self-levelling, which means its viscosity is low enough to develop an even surface after being spread, e.g. by rolling or brushing.

Suitably, the respective base coating composition applied is then cured at least to the point that it is walkable, before a next layer of the multilayer coating composition is applied. Also after applying a next layer, the curing of the underlying layer can continue.

The inventive coating composition for the top coat is preferably applied with a coverage rate in the range of 0.1-0.5 l/m².

Suitable conditions for applying and curing of both the base coating composition and the inventive coating composition are as follows:
- a temperature in the range of 5 to 30° C.;
- a relative humidity in the range of 10% RH to 80% RH.

As a guideline for practical use, the time to be walkable after application for both the base coating composition and the inventive coating composition is usually not more than about 20 hours at 20° C. and 50% RH, preferably not more than about 14 hours.

Thus a method for preparing a multilayer coating system may comprise
- optionally applying a primer and/or an undercoat on a substrate;
- applying a base coating composition in liquid or pourable state onto the substrate or the primer and curing it at least partially, wherein a reinforcement component such as fibre reinforcement mesh may be placed in the base coating composition within the open time of the base coating composition;
- optionally applying a further base coating composition on the at least partially cured base coat, on which the reinforcement component may be present, and curing it at least partially;
- applying the inventive coating composition in liquid or pourable state on the at least partially cured base coat and curing it to obtain the top coat.

The multilayer coating system is particularly suitable for exterior applications such as balcony, terrace, gallery on the outside of buildings or roof including a roof deck or a roof garden, in particular balcony applications. Accordingly, the multilayer coating system of the invention is preferably a balcony, terrace, gallery or roof coating system, in particular a balcony coating system. The multilayer coating system is particularly suitable for refurbishment purposes.

The invention is also related to the use of a coating composition according to the invention as a top coat of a balcony, terrace, gallery or roof multilayer coating system.

EXAMPLES

1. Test Methods Used

Cleanability: 1 mL of DC533 (black pigment dispersion in plasticizer) was brush-applied to each coated QUV panel (15 cm×7.5 cm) and left for periods of 2 and 24 hours; the coated QUV panel was lightly wiped clean of any residual pigment with a paper towel before being washed with cold tap water and wiped again. Results are graded from 1-5, with 1 representing the easiest to clean.

Yellowing: Coated QUV panels were exposed to QUV A and QUV B for 250 hours in a QUV Accelerated Weathering Tester from Q-LAB, UK. Results are graded from 1-5, with 1 representing the least amount of yellowing. The measurement was in accordance with ASTM G154.

QUV A refers to irradiation with a UVA 340 lamp (give the best simulation of sunlight in the critical short wavelength region from 365 nm down to the solar cut-off of 295 nm). QUV B refers to irradiation with a UVB 313 lamp (maximize acceleration utilizing short-wave UV that is more severe than the UV normally found at the earth's surface).

Contact Angle: Measurements were made on a Kruss Drop Shape Analyser (DSA). A single drop of water was lowered onto a coated QUV panel and the contact angle (θ) calculated between the horizontal and a tangent drawn at the liquid air interface.

Transparency: 2 mL of each coating composition was painted out (only top coat) onto a hiding card (17 cm×10 cm) in a thickness of 0.1 mm and the contrast ratio measured on a spectrophotometer (SF600 PLUS-CT using D65 artificial light); the higher the contrast ratio the lower the transparency (range: 0-100, wherein the boundaries 0 and 100 represent clear and entirely opaque coating, respectively).

Chalking: After QUV A exposure for 250 hours, Sellotape® is placed over the coated QUV panel and peeled off. A white residue on the tape is an indicator of chalking. It is also easy to test for chalking by touch; the panels which exhibit chalking typically leave a white residue on the finger.

N.B. Experiments carried out at room temperature and pressure; all scales used for grading purposes are relative.

2. Used Products/Substances

| | |
|---|---|
| anionic PUD | water-based anionic polycarbonate polyurethane dispersion (31% solids), obtained from isocyanate-functional polyurethane having anionic groups (NCO content ca. 2.89 weight-%) by chain-extension and dispersion in water polyol type: polycarbonate and polyol having acid group, 30 weight-% of polyol in prepolymer. |
| SR420 | Sikafloor ®-420, from Sika AG, Switzerland one-component polyurethane-based coating composition; polyurethane based on aliphatic polyisocyanate, containing aldimine curing agent including dry powder colour pigments: carbon black, yellow and green pigment |
| Hombitec | nanoparticulate $TiO_2$ (<100 nm), Hombitec ®RM110, Huntsman transparent titanium dioxide with inorganic surface coating crystal size ca. 10 nm |
| P25 | nanoparticulate $TiO_2$ (<100 nm), Aeroxide ®$TiO_2$ P 25, Evonik Industries fumed titanium dioxide; primary particle size 21 nm (TEM) |
| TR92 | $TiO_2$ pigment; Tioxide ®TR92, Huntsman crystal size 240 nm, inorganic coating (alumina, zirconia) |

3. Top Coating Composition

For preparation of the top coating composition, the anionic PUD was mixed with wetting agent, coalescing solvent, biocide, wax and further additives to obtain a top coating composition having a solids content of 39.5 weight-%.

For Comparative Example 1 the top coating composition was used as it is without any nanoparticle. For the other samples, particulate $TiO_2$ (type and amount as indicated below) was additionally incorporated in the top coating composition.

For mixing of the components a gyroscopic mixer was used (all components added, mixed at 2500 RPM for 3 minutes until homogeneous).

4. Examples 1-6 and Comparative Examples 1-3

A two-coat system was prepared by applying SR420 on a QUV panel (aluminum panel (7 cm×15 cm)) to provide a base coat with a layer thickness of 900 μm (curing time 24 hours/ambient conditions as previously defined). A top coating composition prepared as described above and containing $TiO_2$ nanoparticles Hombitec in varying amounts was applied with a coverage rate of 0.15 L/m² on the base coat as the top coat (curing time 24 hours/ambient conditions as previously defined). Application is effected by roller application.

The amount $TiO_2$ given in Table 1 relates to content of added particulate $TiO_2$ contained in the top coating composition in weight percent based on solids content of the top coating composition (inclusive particulate $TiO_2$).

The two-coat systems obtained were assessed with the test methods indicated above except for the transparency test. For the transparency test, only the top coating composition was applied on a hiding card (see test method for details). The results are also shown in Table 1.

TABLE 1

| Test (Conditions) | | Comp.-Ex. 1 | Ex. 1 | Ex. 2 | Ex. 3 | Comp.-Ex. 2 | Comp.-Ex. 3 |
|---|---|---|---|---|---|---|---|
| | | Amount $TiO_2$ (Type) | | | | | |
| | | 0.0 weight-% (Hombitec) | 0.25 weight-% (Hombitec) | 0.50 weight-% (Hombitec) | 1.25 weight-% (Hombitec) | 15.0 weight-% (Hombitec) | 20.2 weight-% (Hombitec) |
| Cleanability (2/24 hours) | | 4/5 | 1/5 | 1/5 | 1/5 | 2/5 | 3/5 |
| Yellowing | QUV A | 3 | 2 | 3 | 3 | 4 | 2 |
| (250 hours) | QUV B | 5 | 3 | 4 | 4 | 2 | 2 |
| Contact Angle | | 75.3 ± 2.16° | 70.8 ± 1.04° | 77.7 ± 2.36° | 68.8 ± 0.22° | 74.3 ± 1.97° | 73.8 ± 1.55° |
| Transparency | | 5.50 | 5.63 | 5.87 | 6.24 | 22.07 | 32.41 |
| Chalking | | no | no | no | no | no | no |
| | | | Ex. 4 | | Ex. 5 | | Ex. 6 |
| | | | Amount $TiO_2$ (Type) | | | | |
| Test (Conditions) | | | 1.74 weight-% (Hombitec) | | 2.50 weight-% (Hombitec) | | 3.65 weight-% (Hombitec) |
| Cleanability (2/24 hours) | | | 2/5 | | 2/5 | | 2/5 |
| Yellowing | QUV A | | 4 | | 4 | | 4 |
| (250 hours) | QUV B | | 4 | | 3 | | 5 |
| Contact Angle | | | 56.6 ± 2.58° | | 32.8 ± 1.50° | | 29.4 ± 2.31° |
| Transparency | | | 6.85 | | 7.18 | | 7.43 |
| Chalking | | | no | | no | | no |

5. Examples 7-9 and Comparative Example 4

A two-coat system was prepared in the same way as in Examples 1-6, except that the $TiO_2$ nanoparticles Hombitec in the top coating composition were replaced by $TiO_2$ nanoparticles P25 in the amounts given in Table 2 (amount $TiO_2$ is as defined above). The two-coat systems obtained were assessed with the test methods indicated above except for the transparency test. For the transparency test, only the top coating composition was applied on a hiding card (see test method for details). The results are also shown in Table 2.

TABLE 2

|  | Ex. 7 | Ex. 8 | Ex. 9 | Comp. Ex. 4 |
| --- | --- | --- | --- | --- |
| Amount TiO$_2$ (Type) | 0.25 weight-% (P25) | 1.74 weight-% (P25) | 2.50 weight-% (P25) | 20.2 weight-% (P25) |
| Test (Conditions) | | | | |
| Cleanability (2/24 hours) | 2/5 | 3/5 | 2/5 | 4/5 |
| Yellowing QUV A (250 hours) | 4 | 5 | 5 | 4 |
| QUV B | 3 | 5 | 5 | 4 |
| Contact Angle | 25.5 ± 2.33° | 30.3 ± 2.16° | 52.4 ± 1.12° | N/A |
| Transparency | 5.87 | 7.60 | 7.87 | 14.62 |
| Chalking | no | no | no | no |

N/A = not applicable

6. Comparative Examples 5 to 8

A two-coat system was prepared in the same way as in the Examples 1-6, except that the TiO$_2$ nanoparticles Hombitec in the top coating composition were replaced by TiO$_2$ pigment TR92 in the amounts given in Table 3 (amount TiO$_2$ is as defined above). The two-coat systems obtained were assessed with the test methods indicated above except for the transparency test. For the transparency test, only the top coating composition was applied on a hiding card (see test method for details). The results are also shown in Table 3.

TABLE 3

|  | Comp.-Ex. 5 | Comp.-Ex. 6 | Comp.-Ex. 7 | Comp.-Ex. 8 |
| --- | --- | --- | --- | --- |
| Amount TiO$_2$ (Type) | 0.25 weight-% (TR92) | 1.74 weight-% (TR92) | 2.50 weight-% (TR92) | 20.2 weight-% (TR92) |
| Test (Conditions) | | | | |
| Cleanability (2/24 hours) | 2/5 | 2/5 | 2/5 | 2/5 |
| Yellowing QUV A (250 hours) | 3 | 2 | 2 | 1 |
| QUV B | 3 | 2 | 2 | 1 |
| Contact Angle | 29.2 ± 3.04° | 47.8 ± 2.38° | 49.4 ± 3.39° | 46.3 ± 2.32° |
| Transparency | 6.34 | 13.57 | 25.56 | 81.45 |
| Chalking | yes | yes | yes | yes |

In each of these test samples UV irradiation destroys the surface of the test samples very fast and leads thereby to "chalking" (newly formed debris of destroyed/degraded coat laying on the surface of the samples during testing). Though chalking/debris protects the coat from yellowing, chalking is a clear sign of very poor UV-stability. These embodiments are therefore useless for practical purposes.

The invention claimed is:

1. A coating composition comprising at least one water-based anionic polyurethane dispersion and 0.1 to 4 weight-% of nanoparticulate TiO$_2$ having an average particle size of not more than 100 nm, based on the solids content of the coating composition, whereby the average particle size of nanoparticulate TiO$_2$ is determined as the number-average primary particle diameter as measured by transmission electron microscopy (TEM) according to ISO/TS 11937:2012, and wherein the coating composition has a pH-value in the range of 7 to 8.5.

2. The coating composition according to claim 1, wherein the nanoparticulate TiO$_2$ has an average particle size in the range of 5 to 100 nm.

3. The coating composition according to claim 1, wherein the at least one water-based anionic polyurethane dispersion is a water-based anionic polycarbonate polyurethane dispersion.

4. The coating composition according to claim 1, wherein the coating composition comprises at least one organic solvent and/or wherein the at least one water-based anionic polyurethane dispersion is contained in an amount of 75 to 85 weight-%, based on the total weight of the coating composition.

5. The coating composition according to claim 1, wherein the polyurethane is a polymer based on at least one polyol comprising a polycarbonate polyol and at least one aliphatic polyisocyanate.

6. A multilayer coating system on a substrate, comprising
a top coat which is a cured coating of the composition according to claim 1, and
one or more base coats which are a cured base coating composition, wherein the base coating composition comprises an isocyanate-functional polyurethane polymer.

7. The multilayer coating system according to claim 6, wherein the base coating composition further comprises at least one organic solvent.

8. The multilayer coating system according to claim 6, wherein the multilayer coating system is a decorative multilayer coating system.

9. The multilayer coating system according to claim 6, wherein at least one base coating composition comprises at least one curing agent, wherein the at least one curing agent is at least one aldimine and/or at least one oxazolidine.

10. The multilayer coating system according to claim 9, wherein the at least one curing agent is at least one aldimine having quaternary carbon atoms in alpha position to the aldimine group carbon atoms.

11. The multilayer coating system according to claim 6, wherein the isocyanate-functional polyurethane polymer of the base coating composition is based on at least one aliphatic polyisocyanate.

12. The multilayer coating system according to claim 6, wherein at least one base coat comprises a colour pigment and/or the multilayer coating system includes colour chips and/or colour quartz sand.

13. The multilayer coating system according to claim 6, wherein the multilayer coating system is a balcony, terrace, gallery or roof coating system.

14. A method comprising coating a surface of a balcony, terrace, gallery or roof with the coating composition according to claim 1.

* * * * *